(12) United States Patent
Grosskopf

(10) Patent No.: US 6,252,717 B1
(45) Date of Patent: Jun. 26, 2001

(54) OPTICAL APPARATUS WITH AN ILLUMINATION GRID AND DETECTOR GRID HAVING AN ARRAY OF ANAMORPHIC LENSES

(76) Inventor: Rudolf E. Grosskopf, Eschenweg 11, D-89551 Königsbronn (DE)

(*) Notice: Subject to any disclaimer, the term of this patent is extended or adjusted under 35 U.S.C. 154(b) by 0 days.

(21) Appl. No.: 08/964,126

(22) Filed: Nov. 4, 1997

(30) Foreign Application Priority Data

Dec. 12, 1996 (DE) .............................................. 196 51 667

(51) Int. Cl.[7] .............................. G02B 27/10; H01J 3/14; H01J 5/16; H01J 40/14
(52) U.S. Cl. ........................... 359/619; 359/626; 250/234
(58) Field of Search .................................... 359/383, 389, 359/397, 619, 625, 626; 362/342; 250/203.1, 208.1, 216, 234

(56) References Cited

U.S. PATENT DOCUMENTS 5,239,178 * 8/1993 Derndinger et al. .................. 250/234
5,260,826   11/1993 Wu ........................................ 359/368
5,369,659 * 11/1994 Furumoto et al. ..................... 372/50
5,493,391 * 2/1996 Neal et al. ............................. 356/121

FOREIGN PATENT DOCUMENTS 26 34 655 C2    5/1984  (DE) .
4017485A1      12/1991  (DE) .
69313024T2     12/1993  (DE) .
64-55513        3/1989  (JP) .

* cited by examiner

Primary Examiner—Ricky Mack
(74) Attorney, Agent, or Firm—Fish & Richardson P.C.

(57) ABSTRACT

An apparatus for three-dimensional investigation of an object including an illuminating grid located in an illumination plane and generating a plurality of points of light when illuminated by a light source; an optical imaging system that images the illuminating grid in a focal plane at the location of the object to be measured and also images light radiated from the object into a receiver plane; a receiver array with photosynthesis areas that records the light transmitted by optical imaging system and the light that is reflected in or at the object or is emitted by fluorescence; and an array of anamorphic lenses located in front of receiver array.

20 Claims, 6 Drawing Sheets

OPTICAL APPARATUS WITH AN ILLUMINATION GRID AND DETECTOR GRID HAVING AN ARRAY OF ANAMORPHIC LENSES

BACKGROUND OF THE INVENTION

The present invention relates to a device for three-dimensional investigation of an object.

A device of this kind is known from DE 40 35 799. In that patent, an illuminating grid with a pixel size is imaged on a receiver array, which matches the pixel size of the photosensitive areas of the receiver array or is a whole-number multiple of said array. The diaphragm action of the receiver array is utilized. A system of this kind has the disadvantage that during the evaluation of images taken from various object planes to determine the depth values, the absolute brightness values are always evaluated and their maximum must be determined.

A device that makes it possible to determine the distance of a measured location with zero signal detection and with anamorphic imaging of a point is also known. The light from a laser diode is imaged on the object to be illuminated and the light reflected from the object is imaged by an anamorphic lens in such fashion that an approximately circular image of the point results in an intermediate plane between the two focal planes defined by the anamorphic lens. Outside this intermediate plane, with sufficient evaluation of the image by radiation receivers designed for the purpose, a system of this kind supplies a directional signal that indicates in which direction the position of the measured object differs from the set position. Systems of this kind are used in compact disk players. However, only a single point on the object is picked up in the course of this process. Therefore, measurements using a system of this kind require a great deal of time in metrology, with many measurement points having to be detected in a short time. This is especially true when large areas of the object are to be measured.

BRIEF SUMMARY OF THE INVENTION

The present invention has the goal of providing a device that makes it possible to determine the set interval using zero signal detection and in this way to detect many measurement points at the same time.

The system according to the invention has the advantage that the spacing of the individual measurement points is determined for example by zero signal detection and that very many measurement points are detected simultaneously. This is performed economically because receiver arrays, preferably CCD arrays and arrays made of anamorphic lenses, are used as the radiation receivers, which can be manufactured economically by compression molding for example.

Signal detection is implemented by the arrangement of the receiver array relative to the array of anamorphic lenses in such fashion that, at the set light spacing, the image of the light reflected from the illuminated point on the sample and imaged by an anamorphic lens falls in the shape of a circle on four radiation receivers (pixels) of the receiver array in such fashion that each radiation receiver receives the same amount of light or an amount of light that is determined relative to the amounts of light that fall on the radiation receiver or receivers associated with this point.

The system according to the invention differs from the system described in Patent DE 40 35 799 in that the diaphragm function of the radiation receivers arranged in an array is utilized in the latter, with the photosensitive areas of said receivers being separated from one another by gaps. Spacing detection is performed by evaluating the intensity maximum detected on each pixel of the radiation receiver array. For this purpose, a measurement series is performed that stores the values for several different z-positions of the object in the computer. For each pixel, this determines the z-position at which its intensity has its maximum. The spacing value to be determined is obtained from the latter. In the present invention, on the other hand, the difference or a set ratio of the signals of adjacent pixels of the receiver array is evaluated. The place where the zero value or the set ratio is reached is the set position that supplies the depth value to be determined. Receiver arrays are used for this purpose that have no zone that is insensitive to light, or only a very small zone of this kind, between adjacent pixels. For detecting the spacing signal in the present invention, it is necessary to use receiver arrays with photosensitive areas that are directly adjacent to one another. For this reason, the system according to the present invention differs basically from that described in the abovementioned DE.

The system according to the invention is especially suitable for three-dimensional measurement of mechanical parts in incident light and for recording 3-D images of fluorescent objects. For mechanical parts, a semi-transparent mirror is placed in known fashion in the beam path to separate the illuminating light from the light reflected from the object. For fluorescence applications, a dichroic mirror is used in a manner known of itself, and possibly light filters as well, to separate the illuminating light and the light emitted by fluorescence from the object.

BRIEF DESCRIPTION OF THE DRWINGS

The invention will now be described in greater detail with reference to the embodiments shown in FIGS. 1 to 24.

DETAILED DESCRIPTION OF THE INVENTION

Figure 1:
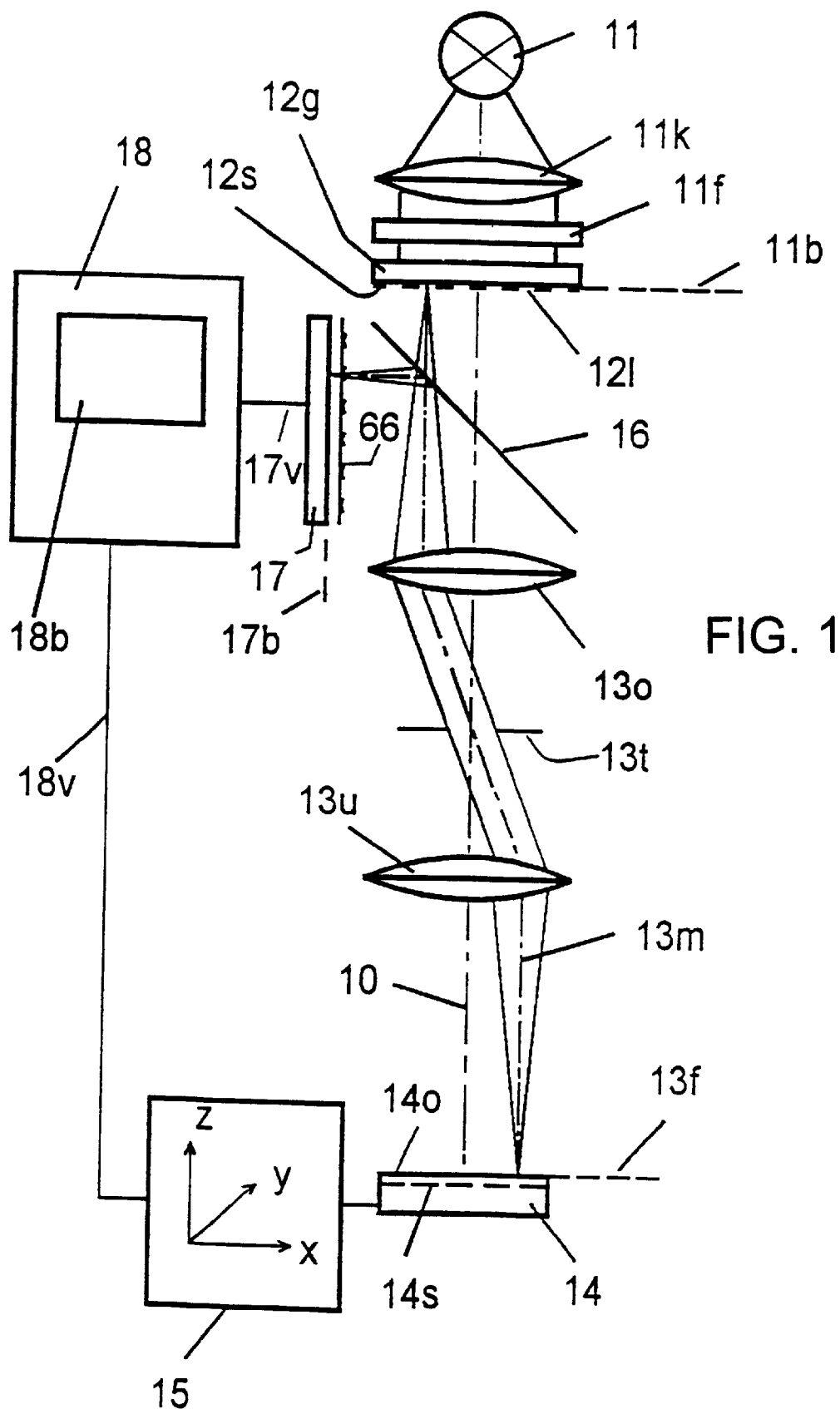
FIG. 1 is a design in which the illuminating grid is produced by a glass plate with holes.

In FIG. 1, 11 refers to a light source, for example a halogen lamp, which, with the aid of condenser 11k and possibly with a filter 11f (to separate out a sufficiently narrow range of the spectrum), holes 121 in a layer 12s. A layer of this kind can be produced in known fashion for example from chromium on a glass plate 12g. The holes 121 are arranged in a layer 12s in the same grid shape as the photosensitive areas of receiver array 17. For example, if a receiver array with 512×512 receivers is used, said receivers being arranged in the form of a grid at a distance of 11 $\mu$m, the layer then has 256×256 holes spaced 22 $\mu$m apart and with a hole size of 4 $\mu$m×4 $\mu$m for example. Hence, the holes are much smaller than their spacing. The spacing of the holes or areas from center to center is termed the grid size.

The illuminating grid that is generated by illuminated holes 121 in layer 12s lies in illumination plane 11b. This plane is imaged by lenses 13o, 13u in focal plane 13f, so that in the latter object 14 is illuminated with points of light arranged in the form of a grid. In the case of objects that are not transparent, only surface 14o can be illuminated, while in transparent objects, layers 14s inside can also be illuminated with the light points. The light beams reflected from the object in plane 13f are imaged by lenses 13u, 13o through a beam splitter 16 in receiver plane 17b. Diaphragms are produced in the plane of anamorphic lenses 66 by the edges of the anamorphic lenses that are separated from one another by gaps. Between lenses 13o, 13u, a so-called telecentric diaphragm 13t is usually provided, said diaphragm ensuring that center beam 13m strikes object 14 parallel to optical axis 10 so that the positions of the points of light on the object do not change if object 14 is moved in the direction of optical axis 10.

The above-mentioned beam splitter 16 is made in the form of a semi-transparent mirror for incident light applications. For fluorescence applications, a dichroic mirror is used in known fashion.

Object 14 can be moved by an adjusting device 15 in all three directions in space, so that various layers 14s of object 14 can be scanned. The movement in the x- and y-directions can be selected to be less than the grid size of light points if a position measurement is specified that has a higher resolution than that provided by the grid size. Of course, the movement of object 14 in the z-direction can also be produced by shifting lenses 13o, 13u in the direction of optical axis 10 and similarly, instead of moving the object in the x- and y-directions, the layer 12s with the holes 121, lens array 66, and receiver array 17 can be moved accordingly as well.

The signals from receiver array 17 are transmitted through a connecting line 17v to a computer 18 which performs the evaluation in known fashion and displays the results of the evaluation on a screen 18b, for example in the form of graphic images. Computer 18 can also control the shifting of measurement plane 13f in the object and scanning in the x- and y-directions through connecting line 18v. This control can be provided in the computer as a fixed program or can be performed as a function of the results of the evaluation.

Figure 2:
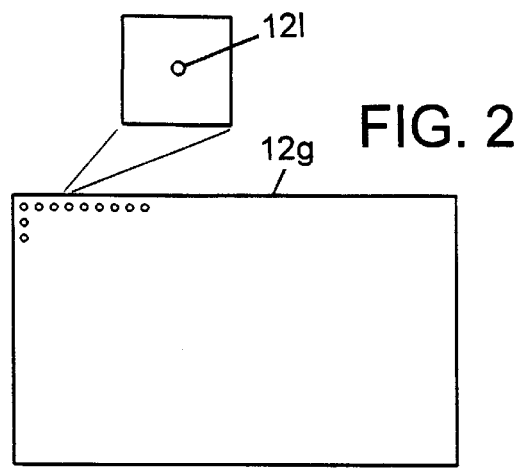
FIG. 2 shows a glass plate with holes.

FIG. 2 shows a glass plate 12 g in a top view, with an illumination point 121 being shown enlarged. The provision of the illumination points in the shape of an array is merely indicated; in reality, as already mentioned, with a grid-type arrangement, for example, there are 128 lines with 128 illuminated points each.

Figure 3:
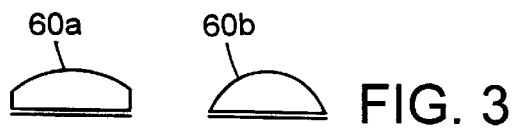
FIG. 3 shows an anamorphic lens in two side views.

In FIG. 3, a single anamorphic lens 60a, 60b is shown in two side views. Arrows A (corresponding to 60a) and B (corresponding to 60b) in FIG. 4 indicate the directions of the views.

Figure 4:
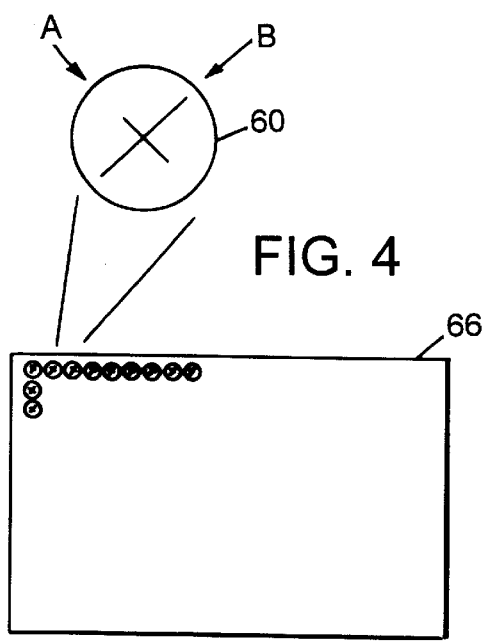
FIG. 4 shows an array with anamorphic lenses.

FIG. 4 shows an array of anamorphic lens 66 in a top view. A single lens 60 is shown enlarged. It is advantageous to provide as many anamorphic lenses as there are illumination points.

Figure 5:
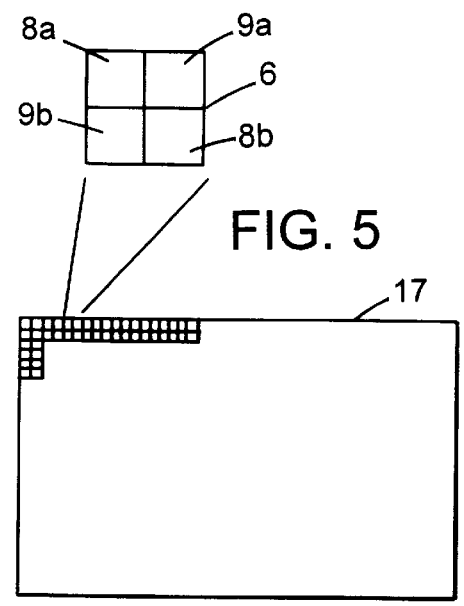
FIG. 5 shows a receiver array on the same scale.

FIG. 5 shows, on the same scale, the corresponding receiver array 17. A receiver quadruple 6 is associated with each anamorphic lens, said quadruple consisting of receiver pair 8a, 8b and receiver pair 9a, 9b and hence of a total of four individual receivers 8a, 8b, 9a, 9b.

Of course, this is only an example. Systems with only two radiation receivers (pixels) per anamorphic lens are also possible, for example.

Figure 6:
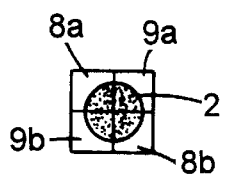
FIG. 6 shows a receiver quadruple with the image of the illuminated point at the set position.

FIG. 6 shows the image generated by an anamorphic lens for the case in which the corresponding measurement location on the object is at the set distance. It is evident that its image in the example shown is circular and that receivers 8a and 8b and receivers 9a and 9b receive the same amounts of light. Hence, the set distance is obtained when the illumination point is focused on object 14 and its image in receiver plane 17b is circular. It should be noted in particular that proper function of a system according to the invention does not require providing the circular shape shown here for the set position. It merely represents one possible and favorable form of the image of the object point. Procedures in which a specified elliptical shape is specified for the set position and the evaluation proceeds accordingly can also be used.

Figure 7:
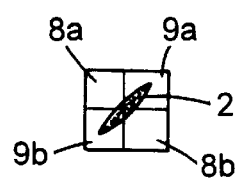
FIG. 7 shows a receiver quadruple with the image of the illuminated point outside the set position.

Outside the set position in the example explained here, more light falls on one of the receiver pairs than on the other. This is shown in FIG. 7. Receivers 9a and 9b receive more light than receivers 8a and 8b. The lack of symmetry is reversed if the position of sample 14 deviates in the other direction from the set position. Then receivers 8a and 8b receive more light than receivers 9a and 9b. Thus the direction signal is obtained. For example, it can be obtained by calculation from the equation $$ud=(L8a+L9b)-(L9a+L9b)$$

Here, ud is the interval signal, which assumes a predetermined value, zero for example, in the set position;

L8a is the signal that is proportional to the amount of light striking receiver 8a;

L8b is the signal that is proportional to the amount of light striking receiver 8b;

L9a is the signal that is proportional to the amount of light striking receiver 9a;

L9b is the signal that is proportional to the amount of light striking receiver 9b.

The interval signal can be used to calculate the set position from the value ud within a measurement range. Therefore, setting the exact set interval in a series of measurements can be eliminated. It can also be used for example to measure by scanning objects 14 that are larger than the visual field of the system in a manner known of itself. It is possible while moving object 14 to calculate a signal representing the average deviation from the set position and to adjust the z-position of the object relative to the measurement system in a coordinate measuring device in such fashion that it follows the surface contours of the object. If this is done at a specific speed such that the computer always controls which receiver displays the partial areas of the object in the visual field at different points in time, it is possible in a form of "drag" to cover an entire strip on the object quickly and to evaluate the peaks from the recorded data. This is explained further below with reference to an example.

Figure 8:
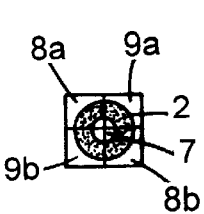
FIG. 8 shows a receiver quadruple with a blackened center and the image of the object point in the set position.
Figure 9:
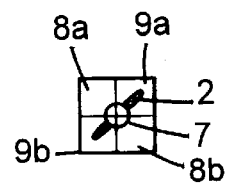
FIG. 9 shows a receiver quadruple with a blackened center and the image of the object point outside the set position.

FIG. 8 shows an embodiment of the receiver quadruple 8a, 8b, 9a, 9b with an area 7 that is blackened and therefore insensitive to light and with the circular image that is produced in the set position by the corresponding anamorphic lens. In FIG. 9, the same system is shown but with the elliptical appearance that results outside the set position. It is evident that receiver pair 8a, 8b in this case receives no light whatever. This is advantageous because as a result the measurement system has a greater sensitivity for detecting deviation from the set position than would be the case if it were not blackened.

Figure 10:
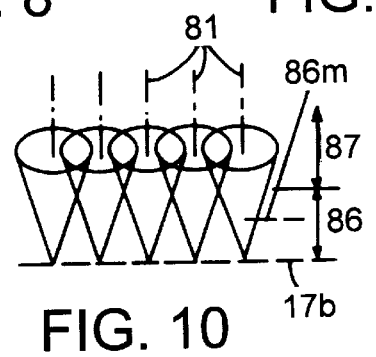
FIG. 10 shows a plurality of light cones in the vicinity of the receiver array.

FIG. 10 is intended to explain in detail the purpose of imaging the beam path as it is done by anamorphic lenses. It is important to locate the array of anamorphic lenses at a suitable distance in front of the receiver array. The light cones from several object points illuminated simultaneously in front of the detector array and their midlines 81 are shown. In area 87, the light cones overlap, while in area 86 they are separate from one another. The array of anamorphic lenses is advantageously located approximately in the center 86m of an area 86. Then the distance between the light cones is sufficiently large and the distance from the receiver array is likewise sufficient.

Figure 11:
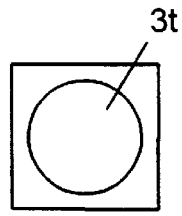
FIG. 11 shows a telecentric diaphragm designed as a full pupil.
Figure 12:
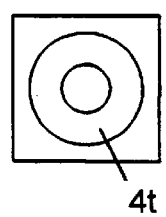
FIG. 12 shows a telecentric diaphragm designed as an annular pupil.

FIG. 11 shows the full pupil of the telecentric diaphragm. It is based on the explanations above. Since the middle beams contribute little to the z-resolution, however, it can be advantageous to screen them out, using an annular diaphragm. An example of this is shown in FIG. 12. Only ring 4t is permeable to light, so that the light beams close to the center are not imaged. The dynamic range of the radiation receiver array can be better utilized as a result, so that a greater deviation signal is obtained outside the set position. To this extent, the annular telecentric diaphragm has an effect similar to the blackening of the center of a receiver quadruple explained with reference to FIG. 8.

Figure 13:
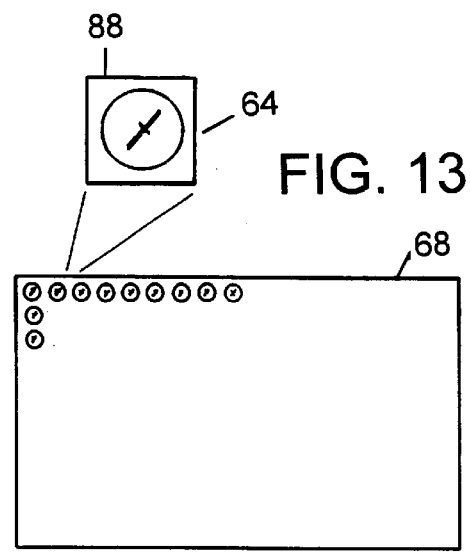
FIG. 13 shows an array of anamorphic lenses with light-permeable gaps.

FIG. 13 shows another embodiment of the array of anamorphic lenses. The anamorphic lenses 64 in array 68 are here delimited in the shape of a circle. The gaps 88 are not transparent to light. Thus a portion of the light that comes from object points located far outside the focus is screened from the receiver array. As a result, noise signals are suppressed. This noise signal suppression, as indicated by the above remarks, is produced by a diaphragm function that is exercised by the marginal boundaries of the circular areas. In contrast to the previously known arrangement according to DE 40 35 799, the diaphragm function follows from the array of anamorphic lenses according to the invention and not from the receiver array. In addition, the diaphragm function in the present invention is not absolutely necessary. It has only a function-improving effect.

Figure 14:
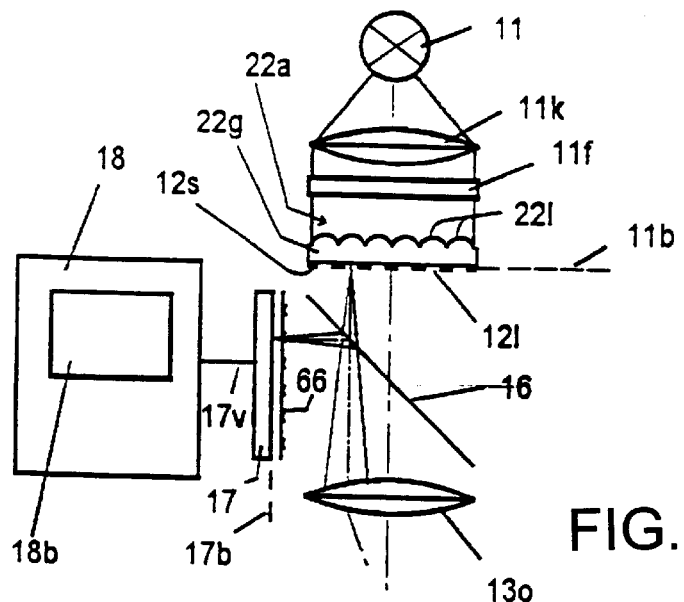
FIG. 14 shows a system with illumination of the holes with a lens array.

In FIG. 14, a lens array 22a is located between condenser 11k and filter 11f and layer 12s with holes 121, said array containing the same number of small lenses 221 as layer 12s has holes 121. Lenses 221 have the purpose of imaging the images of the luminous filaments of light source 11 in the holes, thus giving the points of light a greater intensity.

Lens array 22a and layer 12s with holes 121, as indicated, can be combined into one common part 22g. The manufacture of suitable lens arrays is known for example from a publication by K. Koizumi (SPIE, Volume 1128, 74).

Figure 15:
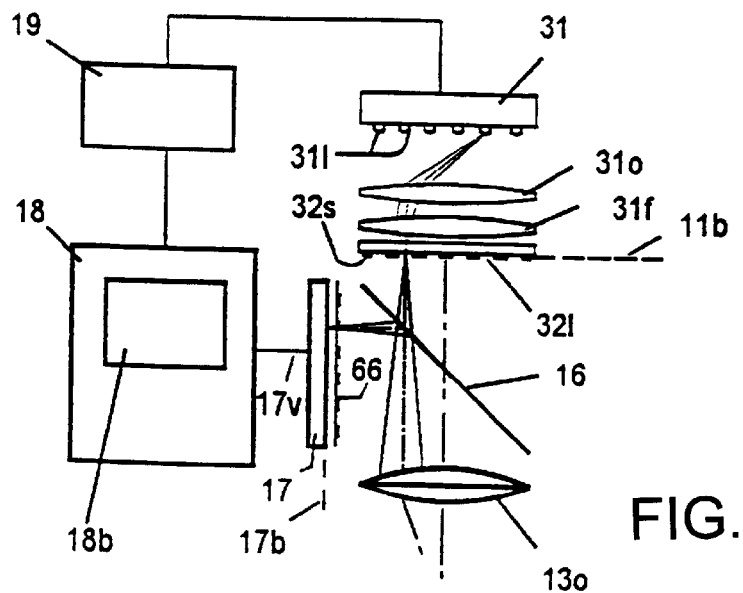
FIG. 15 shows a system with a light source array for illumination.

An especially advantageous version of the illuminating grid is shown in FIG. 15. In that FIG. 31 represents a light source array, which can consist for example of light-emitting diodes (LEDs) 31. In this case also, it can be advantageous to locate in plane 11b a layer 32s with holes 321 so that the points of light have dimensions that are sufficiently small. Except for lens 31o for imaging, a field lens 31f is advantageous for additional imaging in the beam path.

It is advantageous to use integrated LED arrays for the illuminating grid, like those described for example in a paper by J. P. Donnelly (SPIE 1043, 92 (1989)). Such LED arrays have the advantage that certain partial quantities of LEDs can be switched on and off. In both cases, the switching on and off is controlled by computer 18 through switching device 19.

The beam path shown in FIGS. 1, 14 and 15 between illuminating plane 11b, focal plane 13f and diaphragm plane 17b is only a special embodiment of several known beam paths in which the invention can be used in a manner that is immediately apparent to the individual skilled in the art. In addition, in the beam path shown, an image of illuminating plane 11b is not necessary in focal plane 13f on a scale of 1:1. Instead, not only reduction, as is known from microscopes, but also enlargements are possible, for which reason the term "microscope" was not used in the above.

Figure 16:
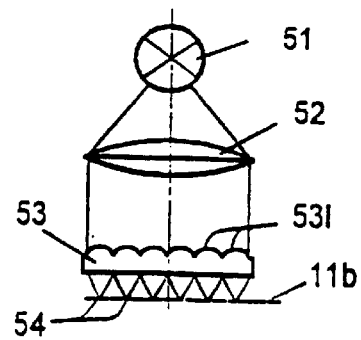
FIG. 16 shows an illuminating system for generating the point grid without using a hole grid.

In FIG. 16, the illuminating grid is formed by a lens array 53, which, thanks to its sufficiently good imaging properties, produces sufficiently small points of light 54 in illuminating plane 11b from a nearly point-shaped light source 51. Condenser lens 52 causes lens array 53 to be traversed by a parallel bundle, so that each individual lens 531 is utilized optimally. A hole grid plate is not required here.

Figure 17:
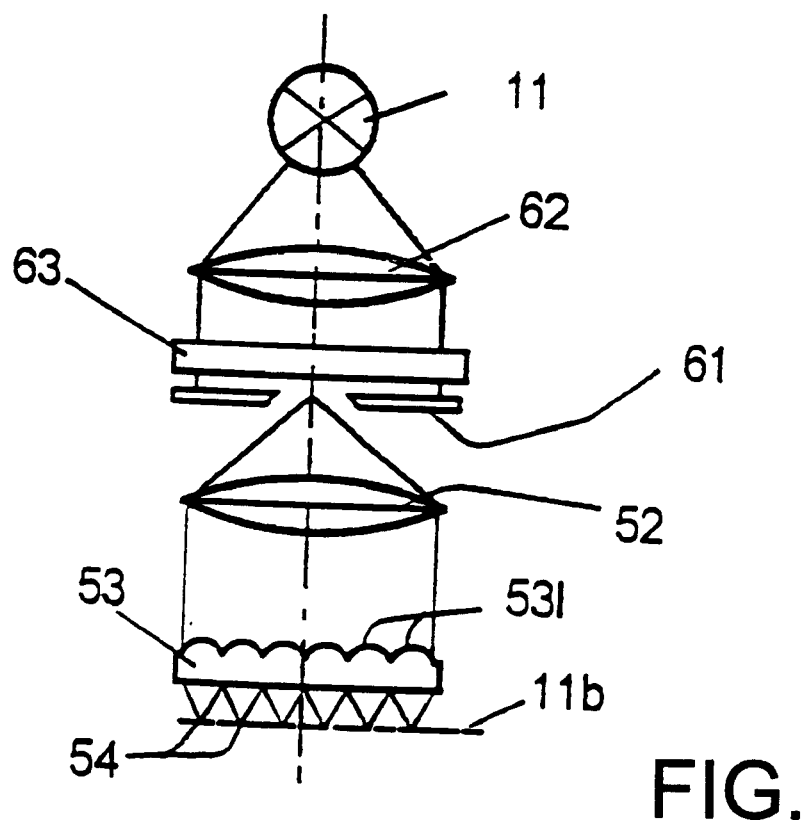
FIG. 17 shows a system in which, by means of a lens array, a diaphragm is multiply imaged in the illumination plane.
Figure 18:
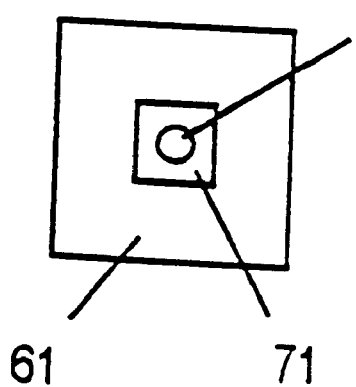
FIG. 18 shows an example of a diaphragm for the system in FIG. 17.

FIG. 17 shows a system in which a diaphragm 61 is multiply imaged in illuminating plane 11b by a lens array 53. This diaphragm is illuminated by light source 11 through condenser 62 and diffuser 63. A wide variety of embodiments is possible for the diaphragm. As an example, FIG. 18 shows a diaphragm 61 with a square boundary for light-permeable area 71 and a light-impermeable center 72 for an illuminating grid.

Figure 19:
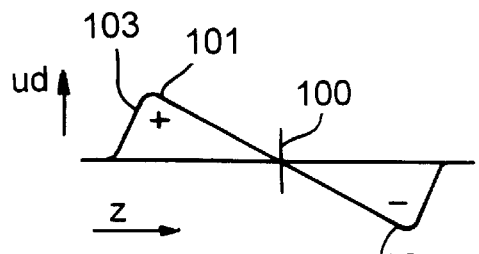
FIG. 19 shows the curve of the difference signal of a radiation receiver quadruple as a function of the deviation from the set point.

FIG. 19 shows schematically the curve 103 of the difference signal ud from a sensor quadruple as a function of the distance of the object. It is evident that the signal is equal to zero at the set position 100 and runs approximately linearly in a range 101 to 103. By a calibration process, the slope can be determined relative to the shift and the distance can be determined by calculation in the computer even without taking a picture. In arrangements in which there is no linear curve but a reproducible curve, a calibration curve (look-up table) may be used. In arrangements in which there is no linear curve but a reproducible curve, a calibration curve (look-up table) may be used*. This is a very important advantage over known confocal systems.

\* Repetition in orginal German. Translator's Note.

Figure 20:
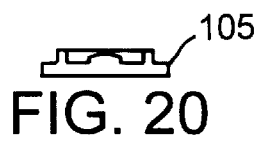
FIGS. 20 and 21 show a mechanical part that serves as an example to explain the measurement strategy.
Figure 21:
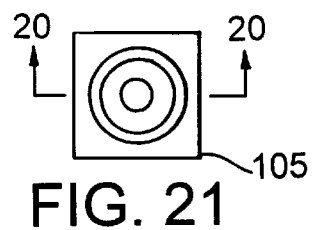

FIGS. 20 and 21 show a mechanical part 105 in two views that serves as an example for explaining advantageous measurement strategies.

Figure 22:
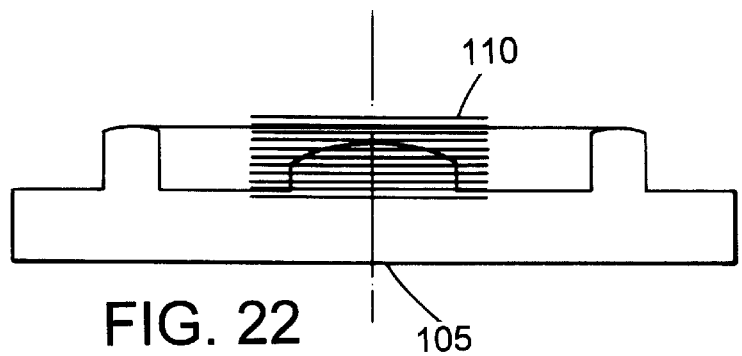
FIGS. 22 and 24 show the positions of various image sequences relative to the part to be measured.

In FIG. 22, section A—A through part 105 is shown enlarged and the sequence of different image planes 110 is shown, said planes being superimposed on one another in the measurement direction (z-direction).

Figure 23:
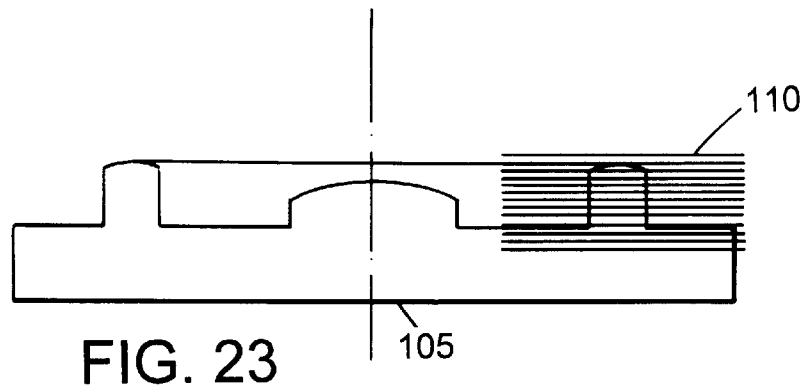

FIG. 23, like FIG. 22, shows another sequence 110 of different image planes superimposed on one another for measuring another area of mechanical part 105.

In a procedure as in FIGS. 22 and 23, after the first measurement sequence is recorded, a longer path

*Repetition in original German. Translator's Note. ds must be traveled which makes a rapid drive for the relative movement between the workpiece and the sensor seem desirable.

Figure 24:
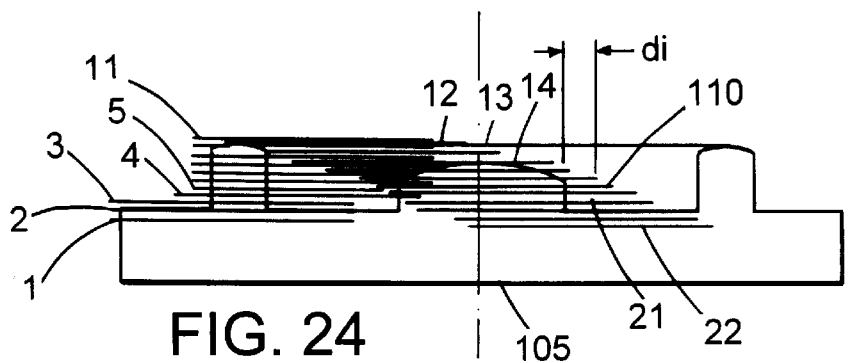

In FIG. 24, a sequence 1 to 22 of image planes is shown of which some (5 to 11) are located on top of one another and others (11 to 22 for example) are arranged so that they overlap at an angle. Recording images that overlap at an angle is advantageous if the measuring device in which the sensor according to the invention is used does not have a rapid drive for x-y movement of the sensor relative to the object or of the object relative to the sensor. Thus, the shifts can take place discontinuously or quasi-continuously without a rapid drive being required that would permit rapid acceleration and rapid stops. Without adversely influencing the measurement speed, by using the measurement strategy outlined in FIG. 24, measurements can be made rapidly using economical measurement systems.

What is claimed is:

1. An apparatus for three-dimensional investigation of an object comprising:

an illuminating grid located in an illumination plane, said grid generating a plurality of points of light when illuminated by a light source;

an optical imaging system that images the illuminating grid in a focal plane at the location of the object to be measured and also images light radiated from the object into a receiver plane;

a receiver array located near the receiver plane with photosensitive areas that record the light transmitted by the optical imaging system and the light that is radiated from the object; and an array of anamorphic lenses located between the optical imaging system and the receiver array and in front of the receiver array.

2. The apparatus of claim 1, wherein the array of anamorphic lenses is an M×N array of anamorphic lenses, wherein M and N are both integers greater than one.

3. The apparatus of claim 2 wherein the array of anamorphic lenses is located within a distance range in front of the plane of the receiver array in which, in a set position, the marginal beams of the light that comes from the corresponding illumination point come to rest within the aperture scanned by the anamorphic lenses.

4. The apparatus of claim 2, wherein each anamorphic lens of the lens array is associated with a different one of the plurality of points of light generated by the grid.

5. The apparatus of claim 2, wherein the receiver array comprises an array of radiation receiver quadruples and wherein each quadruple of the receiver array is associated with a different corresponding one of the anamorphic lenses of the lens array.

6. The apparatus of claim 5, wherein the distance that the receiver array is from the array of anamorphic lenses is such that in the set position the images of the light that is reflected from the illuminated points on the sample and is imaged by the anamorphic lenses fall in the form of a circle on the radiation receiver located in a square in such fashion that the midpoints of the circles coincide with the intersections that the separating lines form between the radiation receivers.

7. The apparatus of claim 5, wherein in the set position, each of the radiation receivers associated with an illuminating point receives receives an amount of light that is set in a ratio to the amounts of light falling on an associated neighbor receiver.

8. The apparatus of claim 7, wherein the difference for a set ratio of the signals of adjacent radiation receivers is evaluated.

9. The apparatus of claim 2, further comprising an annular pupil that functions to screen out the central beams.

10. The apparatus of claim 2, wherein a diaphragm is imaged multiply to generate the illuminating points, said diaphragm having a central area that is impermeable to light.

11. A method for measured value recording with the apparatus of claim 5, comprising storing digitized images from multiple image planes located one on top of the other; individually for each receiving quadruple, evaluating these images for passages through zero of a signal derived from these images; and storing a position of image plane corresponding to the zero passing said stored position representing a depth value at a corresponding location on the object.

12. The method of claim 11, further comprising locating image planes vertically above one another.

13. The method of claim 11, further comprising by utilizing a known curve of a difference signal, interpolating to find a position of the passage through zero and from this determining a position of the object point between two adjacent image planes, and storing this interpolated value as a measurement value for the z-scanning of the object.

14. The method of claim 13, wherein the lateral displacement di that takes place form one image storage to the next image storage is detected by a computer and is taken into account in allocating the measured values.

15. The apparatus of claim 2, further comprising a beam splitter located between the optical imaging system and the imaging grid, wherein said beam splitter is a semitransparent mirror for incident light application.

16. The apparatus of claim 15, wherein said beam splitter is made as a dichroic mirror for fluorescence applications.

17. The apparatus of claim 2, wherein the illuminating grid is imaged with a grid size on the array of anamorphic lenses that matches the grid size of the array of anamorphic lenses.

18. The apparatus of claim 2, wherein the optical system comprises an arrangement of optical elements.

19. The method of claim 11, further comprising locating at least some of the image planes diagonally above one another.

20. The apparatus of claim 2, wherein the illuminating grid is imaged with a grid size on the array of anamorphic lenses that is a whole-number multiple of the grid size of the array of anamorphic lenses.

* * * * *